United States Patent [19]

Friesen et al.

[11] 4,347,136

[45] Aug. 31, 1982

[54] BACTERIA STATIC FILTER ASSEMBLY

[76] Inventors: Neil Friesen, 11 Cornwallis Dr., Northwest Calgary, Alberta, Canada, T2K 1T5; Urs Steiner, 2138 - 28th Ave., Southwest Calgary, Alberta, Canada, T2T 1K5

[21] Appl. No.: 235,607

[22] Filed: Feb. 18, 1981

[51] Int. Cl.³ .............................................. B01D 27/02
[52] U.S. Cl. .................................... 210/253; 210/282; 210/289
[58] Field of Search ............... 210/253, 282, 287, 289, 210/291, 323.1, 323.2, 446, 450, 451, 477, 501, 502

[56] References Cited

U.S. PATENT DOCUMENTS

| | | | |
|---|---|---|---|
| 2,463,327 | 3/1949 | Snell et al. | 210/289 |
| 2,593,639 | 4/1952 | Whitehouse | 210/451 |
| 2,772,002 | 11/1956 | Mauro | 210/289 |
| 3,257,315 | 6/1966 | Pall | 210/501 |
| 3,682,315 | 8/1972 | Haller | 210/282 |
| 4,115,272 | 9/1978 | Mukhamedyarov et al. | 210/282 |
| 4,178,249 | 12/1979 | Councill | 210/282 |

FOREIGN PATENT DOCUMENTS 309170 11/1955 Switzerland ................... 210/323.1

*Primary Examiner*—Peter A. Hruskoci
*Attorney, Agent, or Firm*—William R. Hinds

[57] ABSTRACT

This relates to a filter unit which is particularly adapted for removing odors, bacteria and certain chemicals from water. The filter may be utilized as an in-line filter although it is preferable that the filter unit be mounted in parallel pairs with there being end plates at the opposite ends of the filter units to form a filter assembly. The end plates not only have required flow passages therethrough, but also function as supports.

7 Claims, 7 Drawing Figures

BACTERIA STATIC FILTER ASSEMBLY

This invention relates in general to new and useful improvements in filters for liquids, and more particularly to a filter particularly adapted for use in providing better drinking water.

This invention particularly relates to a filter wherein the filter media comprise of carbon particles having silver bonded thereto. Carbon is well known for its ability to remove odors and chemicals from water, while silver is known for its ability to attack bacteria. A filter formed in accordance with this invention will remove ninety percent or more of bacteria instantly and when the water remains within the filter for a period on the order of five to ten minutes, there is a one hundred percent bacteria kill.

Water filters of this type have a flow rate of approximately only one half gallon per minute. This is unsatisfactory for many installations. In accordance with this invention, two or more filters are arranged in an assembly in parallel relation by securing the upper and lower ends of the filters to end plates which also function as supports. The end plates have suitable flow passages therein which are in communication with the filter units so that supply and return lines may be readily coupled to the filter assembly with a minimum of fittings and thus less chance of leakage.

In accordance with this invention, filter assemblies may be coupled either in parallel or in series or a combination of the two so as to provide a greater capacity filter arrangement.

With the above, and other objects in view that will hereinafter appear, the nature of the invention will be more clearly understood by reference to the following detailed description, the appended claims and the several views illustrated in the accompanying drawings:

Figure 1:
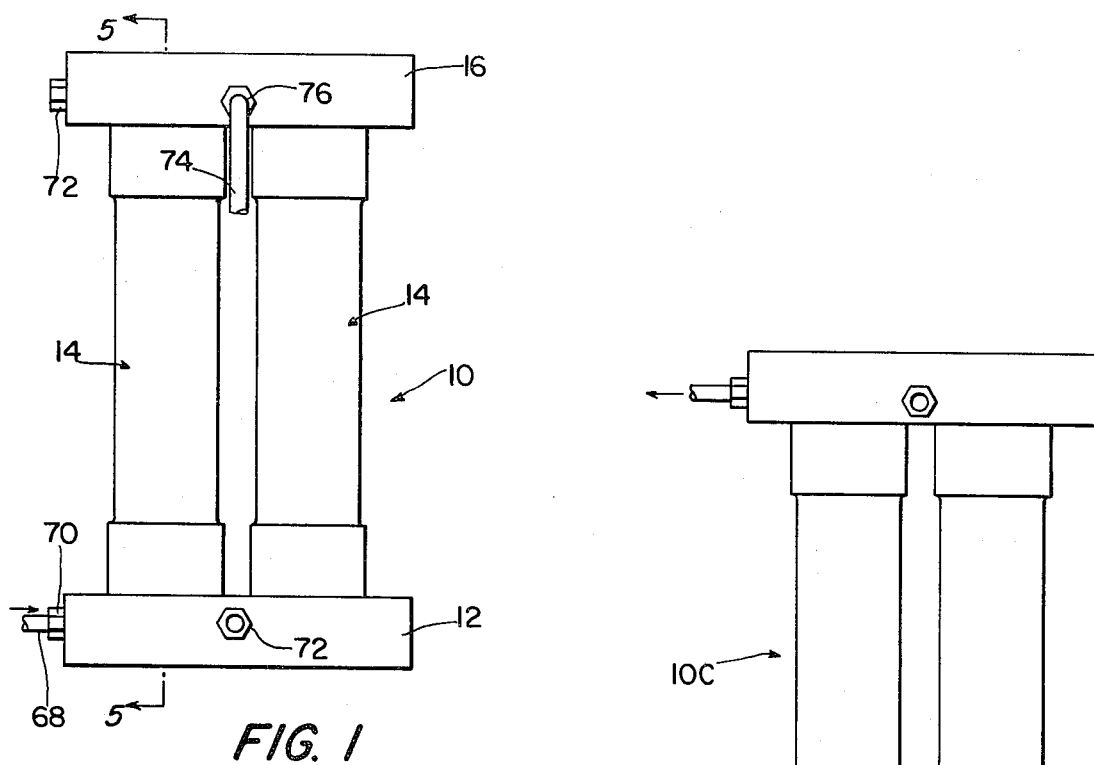
FIG. 1 is an elevational view of a filter assembly in accordance with this invention.

Referring now to the drawings in detail, it will be seen that in accordance with this invention, a typical filter assembly is illustrated in FIG. 1 and generally identified by the numeral 10. The filter assembly 10 includes a bottom end plate 12 which functions as a supporting base for the filter assembly 10. A pair of upstanding filter units, each identified by the numeral 14, are seated on the end plate 12 in sealed relation. The upper ends of the filter units 14 are closed and secured together by an upper end plate 16 which is identical to the end plate 12.

Figure 5:
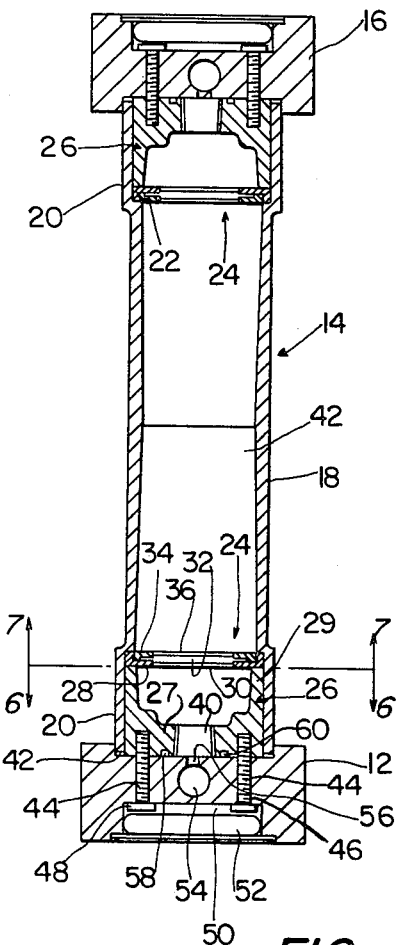
FIG. 5 is an enlarged fragmentary vertical sectional view taken generally along the line 5—5 of FIG. 1 and shows the internal construction of a filter unit and its connection to the end plates.
Figure 6:
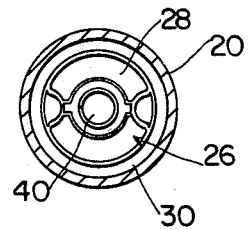
FIG. 6 is a transverse horizontal sectional view taken generally along the line 6—6 of FIG. 5 and shows the internal configuration of an end plug of one of the filter units.

Referring now to FIG. 5, there are illustrated the details of a typical filter unit 14. Each filter unit 14 includes an elongated filter tube 18 which is preferably formed of a suitable plastic material and has enlarged end portions 20. Each end portion 20 defines an internal shoulder 22 on which a screen washer assembly, generally identified by the numeral 24, is seated. Each screen washer assembly 24 is held in seated engagement with its respective shoulder 22 by an end plug 26.

Figure 7:
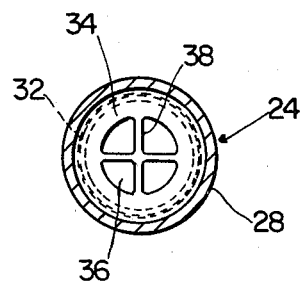
FIG. 7 is a transverse horizontal sectional view taken generally along the line 7—7 of FIG. 5 and shows the general details of a screen washer assembly.

Each screen washer assembly 24 is of a three-piece construction and includes a screen washer holder 28 of plastic, which is generally cup-shaped, but has a central opening 30 therethrough. A screen washer 32 is seated within the screen washer holder 28 and is releasably retained in place by a plastic retainer 34 which is seated within the holder 28 in interlocked relation. The retainer 34 also has a through opening 36 which is aligned with the through opening 30 of the holder 28. If desired, the through openings 30 and 36 may be bridged by a suitable spider arrangement 38, as is clearly shown in FIG. 7.

Each end plug 26 is also of a generally cup-shaped configuration and includes a base 27 and a generally cylindrical body 29. The body 29 has a water-tight fit within the enlarged end 20 and is pressed within the end 20 until the end of the cylindrical body 29 presses against the screen washer assembly 24 to firmly seat it on the respective shoulder 22.

The base of the end plug 26 is provided with a through opening 40 through which the liquid (water) which is being filtered passes. If a single filter unit 14 is utilized, the through opening 40 may have an internally threaded wall configuration for receiving a suitable pipe or tubing fitting. However, in accordance with this invention, it is preferred that the filter units 14 be mounted as parts of a filter assembly 10 with the result that each end plug 26 must be arranged in sealed relation with respect to its associated end plate 12 or 16.

At this time, it is pointed out that the space within the filter tube 18 is filled with a suitable filter medium 42 through which the liquid (water) being filtered passes. The filter medium is formed of charcoal particles having silver bonded thereto.

The filter medium 42 is selected in that carbon is well known for its ability to remove odors and chemicals from water. It also removes chlorine on the order of 99.8 percent, arsenic on the order of 34 percent, fluorides on the order of 20 percent, and nitrates on the order of 92 percent while still leaving essential minerals within the water.

The silver ions permeate the water, attacking the bacteria even after the water has left the filter. The water which is filtered has a bacteria removal on the order of 90 percent or more instantly. When the water sits for a period on the order of five to ten minutes, particularly within the filter, there is a 100 percent bacteria kill.

The filter units 14 are preferably coupled in pairs to form a filter assembly in view of the low capacity of each filter unit.

Referring once again to FIG. 5, it will be seen that each of the end plates 12, 16 is provided with a socket 42 for an end of each filter tube 18. The end plates 12 and 16 are secured to the filter units 14 by fasteners 44 which extend through bores 46 in the end plate and are threaded into the end plugs 26. The fasteners 44 have heads 48 which are seated in an enlarged socket 50 which, in turn, is normally closed by means of a suitable plug 52.

Each of the end plates 12, 16 has a longitudinally extending flow passage 54 which opens into a respective one of the sockets 42 through a port 56 of a reduced diameter with respect to both the through passage 40 and the flow passage 54, thereby controlling the flow of the liquid to be filtered through each filter unit 14.

In order to assure a leak-proof seal between each filter unit 14 and its associated end plate, the base 27 of each end plug 26 projects slightly axially beyond the end of the filter tube 18. Further, there is an annular seat 58 formed in the extreme end of the base 27 of each end plug 26 generally concentric with respect to the through passage 40. A suitable sealing ring, such as an O-ring 60, is seated in each recess 58 with the sealing ring compressibly engaging the face of the respective end plate 12, 16 and forming a liquid-tight seal therewith.

Figure 3:
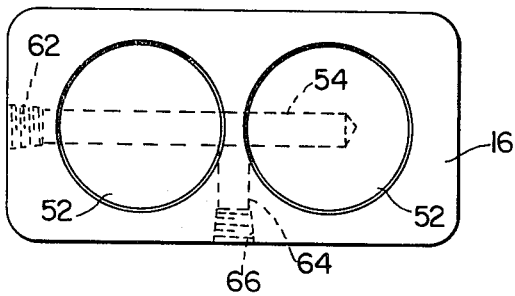
FIG. 3 is an enlarged plan view of FIG. 1 showing the general arrangement of the upper end plate without fittings.
Figure 4:
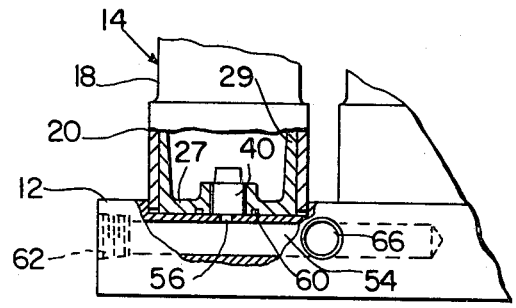
FIG. 4 is an enlarged fragmentary vertical sectional view of the lower left part of the filter assembly of FIG. 1.

Referring now to FIGS. 3 and 4, it will be seen that the flow passage 54 opens through one end of the respective end plate through an internally threaded bore 62 into which a suitable pipe or tubing fitting may be threaded.

There is also a further flow passage 64 which intersects the flow passage 54 and opens out through a side face of the respective end plate through an internally threaded bore 66 which is also adapted to receive a pipe or tubing fitting. Thus, at least one end and one side of each of the end plates 12 and 16 is provided with an internally threaded bore through which a supply line or return line may be suitably coupled to the flow passage 54 and thus to the filter elements 14.

Referring once again to FIG. 1, it will be seen that the liquid (water) to be filtered is supplied to the filter assembly 10 by means of a supply line 68 which includes an end fitting 70 which is threaded into the bore 62 in the end plate 12. In this assembly, the threaded bore 66 is suitably closed by a plug 72. Filtered water or other liquid is delivered from the filter assembly 10 by a return line 74 which is connected to the end plate 16 by way of an end fitting 76 threaded into the internally threaded bore 66 thereof. The internally threaded bore 62 is closed by another plug 72.

It is to be understood that the filter assembly 10 has many uses. For example, it may be readily mounted by merely sitting it on the floor or on a counter utilizing the end plate 12 as a base. The return line 74 may be directly coupled to a suitable supply fitting such as a water tap or it may be used in conjunction with ice making machines or soda fountain arrangements, etc. This invention is in no way related to the specific usage of the filter assembly 10.

Figure 2:
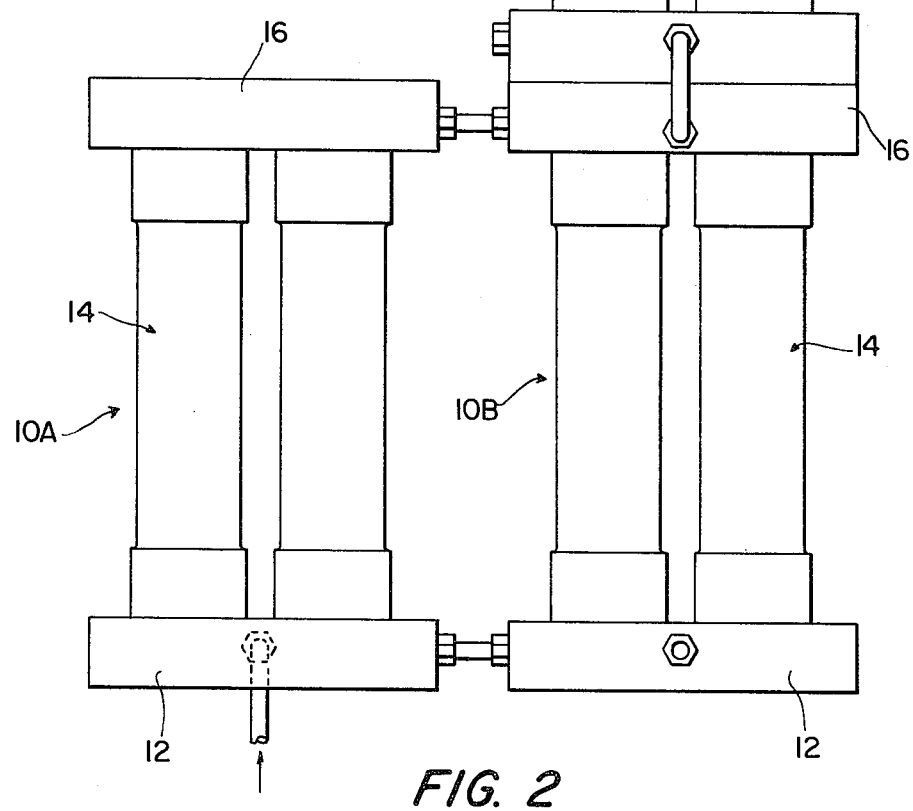
FIG. 2 is an elevational view showing an exemplary manner in which a plurality of the filter assemblies of FIG. 1 may be coupled together either in parallel or in series or both.

Two of the filter assemblies 10 may be connected in parallel, as is shown in FIG. 2 with the filter assemblies being identified as filter assemblies 10A and 10B. In this arrangement, the end plates 12 are coupled together in series as are the end plates 16. The liquid to be filtered enters into one of the end plates 12 and passes through the filter elements 14 of the filter assembly 10A and also into the other end plate 12 and passes into the filter units 14 of that filter assembly. The filtered liquid from the filter assembly 10A passes into the end plate 16 of the filter assembly 10B for return with the liquid filtered by the filter assembly 10B.

The filter assemblies 10 may also be coupled in series by simply mounting one filter assembly on top of the other such as shown by the relationship of the filter assemblies 10B and 10C. In this arrangement, the liquid is twice filtered.

Although only a preferred embodiment of the filter assembly has been specifically illustrated and described herein, it is to be understood that minor variations may be made in the filter assembly without departing from the spirit or scope of the invention as defined by the appended claims.

We claim:

1. A filter assembly comprising two elongated filter tubes, each filter tube having end portions defining remotely facing shoulders in its interior, a screen unit seated on each of said shoulders, an end plug seated in each of said end portions and holding each screen unit seated against its respective shoulder, each of said end plugs having a through passage for a passing liquid, and a filter medium in the filter tube between said screen units, said two filter units being disposed in parallel relation, end plates at opposite ends of said filter units secured to said filter units and forming in combination therewith an integral filter assembly, each of said end plates having flow passages therein in sealed communication with said through passages in said end plugs said flow passages being arranged with said through passages to supply liquid to and remove liquid from said filter medium, each end plug having an outer end opposing a respective end plate, and a sealing ring carried by each end plug surrounding its through passage with each sealing ring compressively engaging a respective end plate.

2. A filter unit according to claim 1 wherein said filter medium is in the form of carbon particles having silver bonded thereto.

3. A filter unit according to claim 1 wherein at least one of said end plates forms a supporting base.

4. A filter unit according to claim 1 wherein said filter units are vertically disposed, and one of said end plates is lowermost and forms a supporting base.

5. A filter unit according to claim 1 wherein each of said end plates has a socket for an end of each said filter units, and each end of each filter unit is firmly sealed in a respective socket by fasteners extending between each end plate and a respective end plug.

6. A filter unit according to claim 1 wherein each screen unit includes a holder, a screen washer seated in said holder, and a removable retainer releasably retaining said screen washer in said holder.

7. Apparatus as claimed in claim 1 wherein said filter tubes have enlarged end portions defining said remotely facing shoulders.

* * * * *